Dec. 6, 1938.   T. P. LEE   2,139,275
EYESHIELD AND VISOR
Filed July 12, 1937
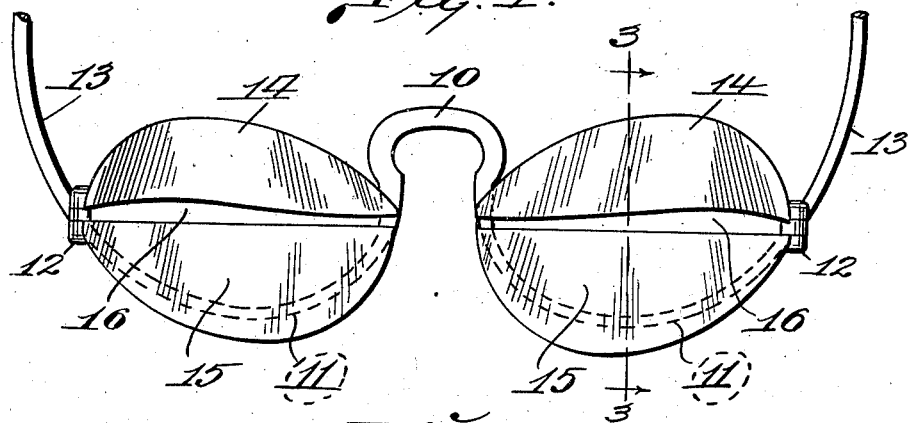
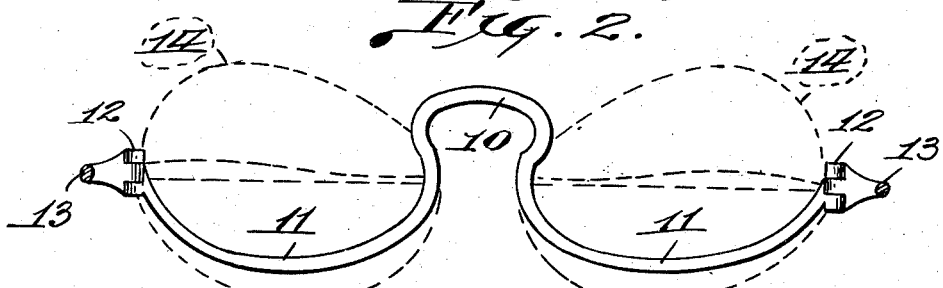
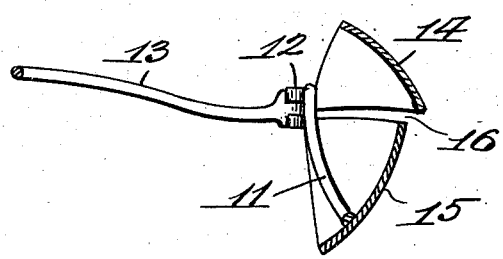
INVENTOR,
THOMAS P. LEE.
By Martin P. Smith, ATTY.

Patented Dec. 6, 1938

2,139,275

UNITED STATES PATENT OFFICE 2,139,275

EYESHIELD AND VISOR

Thomas P. Lee, Inglewood, Calif.

Application July 12, 1937, Serial No. 153,148

1 Claim. (Cl. 2—13)

My invention relates to an eye shield and visor, and has for its principal object the provision of a relatively simple, practical and inexpensive shield or protector for the eyes, and which will afford a maximum degree of protection against bright and glaring rays from the sun, electric lamps, kleig lights and the like, and at the same time enabling the wearer to have direct vision through narrow horizontally disposed slits that are formed between the upper and lower shield members.

A further object of my invention is, to provide an eye shield and visor of the character described which comprises upper opaque members and lower transparent members, both formed of material such as Celluloid, and being mounted on a frame so that the upper edges of the visor members and the lower edges of the lower shade members are exposed so as to be conveniently trimmed off by the wearer, in order that the shade and visor may fit conveniently in the facial depressions immediately surrounding the eyes, thus excluding light rays that might otherwise pass between the edges of the shield and visors and the face of the wearer.

A further object of my invention is, to provide an eye shield and visor wherein the upper visor members are formed of opaque material and the lower shield members being formed of transparent material that may be colored blue, green or amber, in order to soften direct or reflected rays from the sun, electric lamps and other sources of extremely bright light rays.

With the foregoing and other objects in view, my invention consists in certain novel features of construction and arrangements of parts that will be hereinafter more fully described and claimed and illustrated in the accompanying drawing in which:

Figure 1 is a front elevational view of an eye shade and visor constructed in accordance with my invention.

Figure 2 is a rear elevational view of the frame with dotted lines, showing the positions of the visor and shield members.

Figure 3 is a vertical section taken on the line 3—3 of Figure 1.

Referring by numerals to the accompanying drawing which illustrates a preferred embodiment of my invention, 10 designates the arched central portion of a one-piece frame that is constructed preferably from Celluloid or other light-weight composition, and which arched portion is shaped so as to rest on the bridge of the nose.

From the ends of this arched central portion, the frame extends downwardly and outwardly to provide semi-elliptic portions 11.

At the ends of these frame members 11, integral lugs 12 project outwardly, and suitably hinged thereto, are the forward ends of bows 13 that are adapted to pass over the ears of the wearer.

The upper visor members 14 of the shield and protector are formed from thin opaque material such as Celluloid, hard rubber, and in order to counteract all light rays, I prefer to color these visor members black or dark blue. Further, the material used may be prepared or treated so that the inner surfaces of said visor members are dull, in order to entirely eliminate reflected light rays.

The visor members 14 are substantially semi-elliptic in shape, and their inner ends are secured to frame 11 just below the arched central portion 10 thereof, and their outer ends are secured to the outer ends of the frame members 11 adjacent the lugs 12.

When properly applied to the frame, the visor members occupy inclined positions, as illustrated in Figure 3, so that they extend outwardly and downwardly from the upper portions of the facial depressions immediately surrounding the eyes and thus said members function as opaque visors.

The lower shield members 15 are formed of thin, flexible, transparent material such as Celluloid, that is tinted or colored green, blue or amber, in order to counteract bright rays from the sun, electric lamps or the like, and these lower shield members are suitably secured to the frame members 13, throughout the lengths of said shield members. I prefer to secure the lower shield members to the frame members 13 by transparent moisture-proof cement.

The inner ends of the lower shield members 15 are positioned immediately below the inner ends of the visor members 14, and the outer ends of said shield members 15 are secured to the frame members 11 adjacent the lugs 12.

The entire lower portions of the shield members 15 extend substantial distances below the frame members 11, and when the visor and shield is applied for use, the members 15 extend upwardly and outwardly from the lower portion of the depression surrounding the eye, with the substantially straight upper edge of said member positioned just below the lower edge of the corresponding visor member 14.

Inasmuch as the shield members 15 are formed from thin flexible material such as Celluloid, those portions of said shields that extend below the semi-elliptical members 11 of the frame will bend readily and conform to the particular shape of the facial recesses immediately below the eyes of the wearer of the eye shield and visor, and in the event that the lower portions of said shield members do not fit conveniently in the facial recesses, the wearer of the shield and visor may, with a suitable tool such as a knife or scissors, trim off the lower members of the shield members 15 so as to cause the same to fit conveniently.

As illustrated in Figure 3, the lower portion and edge of the visor members 14 project forwardly beyond the upper edges of the shield members 15 and the adjacent edges of said members 14 and 15 are spaced apart so as to provide narrow slots 16 that extend throughout the lengths of said members, thus enabling the wearer to have a limited degree of clear vision, straight forward and laterally and approximately 90° between the opaque visor members 14 and the lower shield members 15.

Such construction minimizes tendency of rain, snow, dust and the like, from entering the slot between the upper and lower shield members.

By extending the lower portions of the shield members 15 below the portions 11 of the frame, the wearer of the combined visor and shield may, with a pair of scissors or other sharp instrument, trim off the lower edges of said members 15 so that they will fit conveniently in the depressions surrounding the eyes.

My improved eye visor and shield being formed wholly of Celluloid or the like, is light in weight and in the event of accidental breakage, will not shatter after the manner of glass and thus a factor of safety is provided for the wearer of the visor and shield. As both the visor and shield members are formed of thin sheet Celluloid or the like, the same may be readily trimmed so as to conveniently fit individual requirements.

In addition to protecting the eyes against glaring rays from the sun, electric lamps and the like, the shield affords a certain degree of protection against rain, snow, dust and the like.

Thus it will be seen that I have provided a combined eye visor and shield that is relatively simple in construction, inexpensive of manufacture and very effective in performing the functions for which it is intended.

It will be understood that minor changes in the size, form and construction of the various parts of my improved eye shield and visor may be made and substituted for those herein shown and described without departing from the spirit of my invention, the scope of which is set forth in the appended claim.

I claim as my invention:

In an eye visor and shield, a frame comprising an arched central portion, semi-elliptic members extending downwardly and outwardly from the ends of said arched central portion, bows hinged to the outer ends of said semi-elliptic members, visor members having their ends secured to the sides of the arched central portion of the frame and to the outer ends of the semi-elliptic portions of the frame and shield members secured to the semi-elliptic portions of the frame below said visor members, the lower portions of which shield members extend below the semi-elliptic portions of said frame.

THOMAS P. LEE.